US008596818B2

(12) United States Patent
Lee et al.

(10) Patent No.: US 8,596,818 B2
(45) Date of Patent: Dec. 3, 2013

(54) OPTICAL MEMBER AND DISPLAY DEVICE HAVING THE SAME

(75) Inventors: Kang-Woo Lee, Suwon-si (KR); Seung-Mo Kim, Yongin-si (KR); Jin-Sung Choi, Yongin-si (KR)

(73) Assignee: Samsung Display Co., Ltd. (KR)

( * ) Notice: Subject to any disclaimer, the term of this patent is extended or adjusted under 35 U.S.C. 154(b) by 802 days.

(21) Appl. No.: 12/571,627

(22) Filed: Oct. 1, 2009

(65) Prior Publication Data

US 2010/0110662 A1 May 6, 2010

(30) Foreign Application Priority Data

Nov. 3, 2008 (KR) .................. 10-2008-0108455

(51) Int. Cl.
*F21V 13/00* (2006.01)
(52) U.S. Cl.
USPC ........... 362/246; 362/626; 362/607; 362/606; 362/558; 362/339; 362/331; 362/337; 362/336; 362/244
(58) Field of Classification Search
USPC ............ 362/97.1–97.2, 97.4, 626, 620, 362/606–607, 614, 558, 561, 339, 330–337, 362/307, 244, 246
See application file for complete search history.

(56) References Cited

U.S. PATENT DOCUMENTS

| 6,767,105 B2 * | 7/2004 | Nakahashi et al. ............. 362/27 |
| 6,951,400 B2 * | 10/2005 | Chisholm et al. ............... 362/29 |
| 7,576,810 B2 * | 8/2009 | Chang .............................. 349/64 |
| 7,744,235 B2 * | 6/2010 | Horikoshi et al. ........... 362/97.4 |
| 7,800,709 B2 * | 9/2010 | Chang .............................. 349/64 |
| 2006/0203517 A1 | 9/2006 | Kang et al. |
| 2006/0256580 A1 | 11/2006 | Kang et al. |
| 2007/0110386 A1 | 5/2007 | Chiang |
| 2007/0121227 A1 | 5/2007 | Wang et al. |
| 2009/0021667 A1 * | 1/2009 | Horiguchi et al. .............. 349/64 |

FOREIGN PATENT DOCUMENTS

| EP | 1870743 A1 | 12/2007 |
| JP | 2007149623 A | 6/2007 |
| JP | 2007264343 | 10/2007 |
| KR | 1020070012754 | 1/2007 |
| KR | 1020070107911 | 11/2007 |
| WO | 2008050763 A1 | 5/2008 |

OTHER PUBLICATIONS

European Search Report for application No. 09013278.8-2205 dated Dec. 4, 2009.

* cited by examiner

*Primary Examiner* — Anne Hines
*Assistant Examiner* — Jose M Diaz
(74) *Attorney, Agent, or Firm* — Cantor Colburn LLP

(57) ABSTRACT

An optical member includes; an incident surface on which light is incident, an exit surface which is disposed substantially opposite the incident surface and from which the light exits, a prism pattern disposed on the exit surface, and a diffusion pattern which is aligned with the prism pattern and is disposed in a total internal reflection region in which the light incident on the incident surface is totally internally reflected by the prism pattern and output through the incident surface.

26 Claims, 7 Drawing Sheets

OPTICAL MEMBER AND DISPLAY DEVICE HAVING THE SAME

This application claims priority to Korean Patent Application No. 10-2008-0108455, filed on Nov. 3, 2008, the contents of which in its entirety are incorporated herein by reference.

BACKGROUND OF THE INVENTION

1. Field of the Invention

The present invention relates to an optical member and a display device having the same, and more particularly, to an optical member, which evenly distributes light, and a display device having the optical member.

2. Description of the Related Art

Liquid crystal displays ("LCDs") are one of the most widely used types of flat panel displays ("FPDs"). A typical LCD includes two display panels, on which electrodes are formed, and a liquid crystal layer which is interposed between the two display panels. The LCD rearranges liquid molecules of the liquid crystal layer by applying a voltage to the electrodes and thus controls an amount of light that passes through the liquid crystal layer. In this way, the LCD displays a desired image.

Being non-self-luminous, LCDs require a light source to operate. One typical light source is a backlight assembly, which includes light-emitting devices to display an image. A backlight assembly provides light to a display panel from behind the display panel and functions as a surface light source which provides substantially uniform light to substantially the entire surface of the display panel.

Backlight assemblies are classified into direct-type backlight assemblies and edge-type backlight assemblies according to the position of light sources which emit light within the backlight assembly. In direct-type backlight assemblies, light sources are disposed under a display panel and light from the light sources travels in a direction substantially perpendicular to a plane of the display panels. In edge-type backlight assemblies, light sources are disposed under one or more sides of a display panel, and light emitted from the light sources is delivered to the display panel via a light guide plate, e.g., the light is redirected to be perpendicular to a plane of the display panels.

Since light sources are disposed under a diffusion plate in direct-type backlight assemblies, bright lines can be formed corresponding to the light sources. In particular, with the current trend of reducing the number of light sources, the probability of the formation of bright and dark lines is increasing.

In this regard, a prism sheet is used to enhance the efficiency of light diffusion and concentration in order to reduce the appearance of bright and dark lines. However, since luminance non-uniformity is increased by the formation of total internal reflection regions in a prism pattern, precise control is required to address this problem.

BRIEF SUMMARY OF THE INVENTION

Aspects of the present invention provide an optical member which evenly distributes light.

Aspects of the present invention also provide a display device having a light guide plate which evenly distributes light.

However, aspects of the present invention are not restricted to the ones set forth herein. The above and other aspects of the present invention will become more apparent to one of ordinary skill in the art to which the present invention pertains by referencing the detailed description of the present invention given below.

According to an exemplary embodiment of the present invention, an optical member includes; an incident surface on which light is incident, an exit surface which is disposed substantially opposite the incident surface and from which the light exits, a prism pattern disposed on the exit surface, and a diffusion pattern which is aligned with the prism pattern and is disposed in a total internal reflection region in which the light incident on the incident surface is totally internally reflected by the prism pattern and output through the incident surface.

According to another exemplary embodiment of the present invention, an optical member includes; an incident surface on which light is incident, an exit surface which is disposed substantially opposite the incident surface and from which the light exits, a prism pattern disposed on the exit surface, a first diffusion pattern which is aligned with the prism pattern and is disposed in a total reflection region in which the light incident on the incident surface is totally internally reflected by the prism pattern, and a second diffusion pattern which is aligned with the prism pattern and is disposed in a transmission region in which the light incident on the incident surface passes through the prism pattern, wherein the first diffusion pattern has a greater light-diffusing capability than the second diffusion pattern.

According to another exemplary embodiment of the present invention, a display device includes; light sources which emit light, a display panel which receives the light and displays an image, and an optical member which is interposed between the light sources and the display panel, wherein the optical member includes; an incident surface on which the light is incident, an exit surface which is disposed substantially opposite the incident surface and from which the light exits, a prism pattern disposed on the exit surface, and a diffusion pattern which is aligned with the prism pattern and is disposed in a total internal reflection region in which the light incident on the incident surface is totally internally reflected by the prism pattern and output through the incident surface.

According to another exemplary embodiment of the present invention, a display device includes; light sources which emit light, a display panel which receives the light and displays an image, and an optical member which is interposed between the light sources and the display panel, wherein the optical member includes; an incident surface on which the light is incident, an exit surface which is disposed substantially opposite to the incident surface and from which the light exits, a prism pattern disposed on the exit surface, a first diffusion pattern which is aligned with the prism pattern and is disposed in a region in which the light incident on the incident surface is totally internally reflected by the prism pattern, and a second diffusion pattern which is aligned with the prism pattern and is disposed in a region in which the light incident on the incident surface passes through the prism pattern, wherein the first diffusion pattern has a greater light-diffusing capability than the second diffusion pattern.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
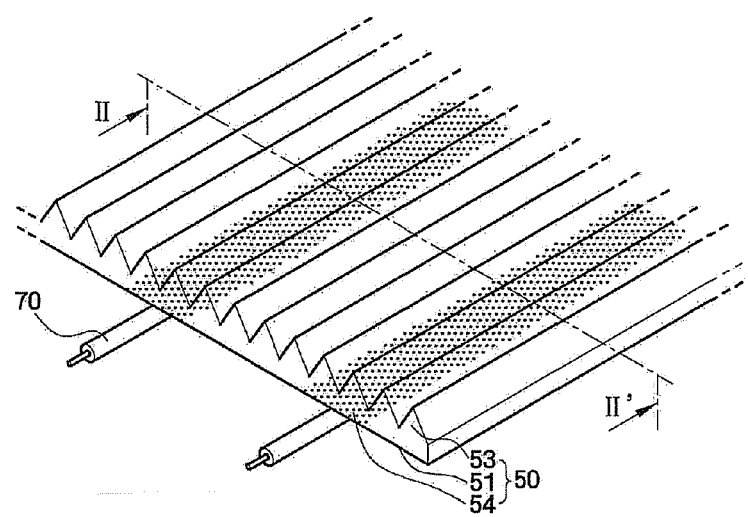
FIG. 1 is a partial front-perspective view of a first exemplary embodiment of an optical member and light sources according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 2:
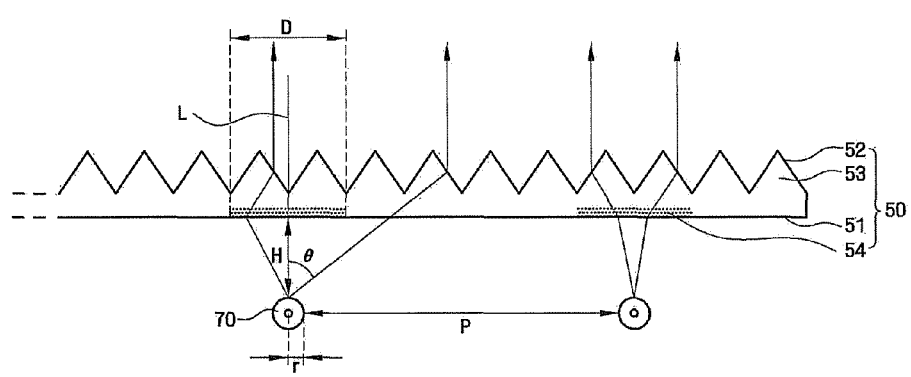
FIG. 2 is a cross-sectional view of the exemplary embodiment of an optical member and the light sources taken along line II-II' of FIG. 1.
Figure 3:
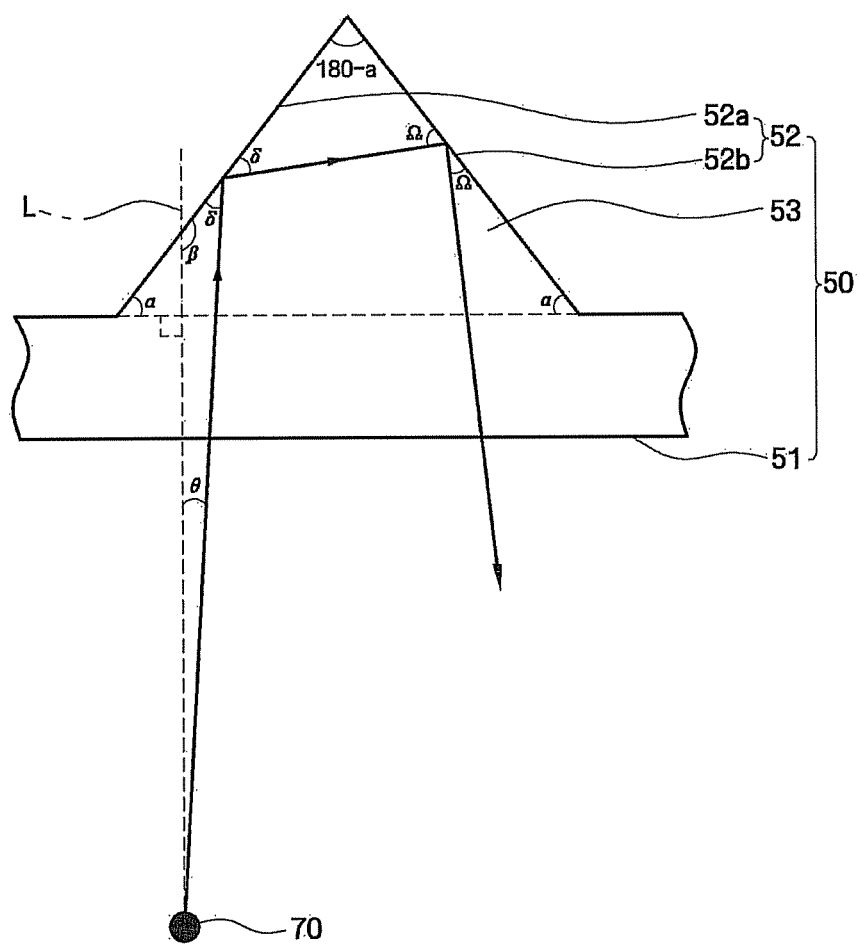
FIG. 3 is a schematic cross-sectional view illustrating a path of light in the exemplary embodiment of an optical member of FIG. 1.

Hereinafter, a first exemplary embodiment of an optical member 50 according to the present invention will be described in detail with reference to FIGS. 1 through 3. FIG. 1 is a partial front-perspective view of the first exemplary embodiment of an optical member 50 and light sources 70 according to the present invention. FIG. 2 is a cross-sectional view of the first exemplary embodiment of an optical member 50 and the light sources 70 taken along line II-II' of FIG. 1. FIG. 3 is a schematic cross-sectional view illustrating a path of light in the optical member 50 of FIG. 1.

The first exemplary embodiment of an optical member 50 according to the present invention is applied to a direct-type backlight assembly. Thus, the light sources 70 are disposed under, and in alignment with, the optical member 50. In one exemplary embodiment, the light sources are disposed directly under the optical member 50.

The optical member 50 includes an incident surface 51 on which light from the light sources 70 is incident and an exit surface 52 which is disposed substantially opposite the incident surface 51 and from which the incident light exits. The optical member 50 may be shaped like a plate or a sheet having a predetermined thickness. In the exemplary embodiment of a direct-type backlight assembly in which the light sources 70 are disposed directly under the optical member 50, a bottom surface of the optical member 50, e.g., a plate or a sheet, may be the incident surface 51, and a top surface thereof may be the exit surface 52.

A prism pattern 53 is formed on the exit surface 52 of the optical member 50. The prism pattern 53 may be formed like furrows from an end of the exit surface 52 to the other end thereof. In one exemplary embodiment, a cross section of each prism of the prism pattern 53 may be triangular. However, the present invention is not limited thereto and alternative exemplary embodiments may include prism patterns 53 having shapes other than triangles. That is, the cross section of each prism of the prism pattern 53 may also be circular, oval, or the like according to design specifications. An exemplary embodiment wherein the cross section of each prism of the prism pattern 53 is triangular will be described in more detail below.

Light generated by the light sources 70 is input to the incident surface 51 of the optical member 50 and output from the exit surface 52 thereof. Then, the light output from the exit surface 52 is provided to a display panel 31 (see FIG. 10). Here, the prism pattern 53 formed on the exit surface 52 of the optical member 50 concentrates the light that is output. That is, light emitted from under the optical member 50 enters the optical member 50 in various directions, not all of which travel in a direction which would eventually lead to the display panel 31. In order to effectively deliver the light to the display panel 31, the light must be concentrated in a predetermined direction.

A diffusion pattern 54 is formed on the incident surface 51 of the optical member 50 to diffuse incident light. The diffusion pattern 54 refracts incident light, which is incident thereon at an incident angle, at various angles to output the light at various angles. In one exemplary embodiment, the diffusion pattern 54 may be formed directly above each of the light sources 70. In one exemplary embodiment, the diffusion pattern 54 may be formed only above each of the light sources 70. In one exemplary embodiment, the diffusion pattern 54 may be formed internal to the incident surface 51 of the optical member 51, e.g., the diffusion pattern 54 is formed within the optical member 50.

Light emitted from the light sources 70 may enter the optical member 50 through various paths. Part of light that is incident on the incident surface 51 of the optical member 50 is refracted and output through the exit surface 52 while part of the light is reflected and output through the incident surface 51. If light incident on the incident surface 51 is reflected off a region of the prism pattern 53 of the exit surface 52 and then output through the incident surface 51, it is said to be totally internally reflected, and cannot exit through the region of the prism pattern 53. Since the light cannot exit through the region of the prism pattern 53 of the exit surface 52, a dark line is formed in the region.

Bright or dark lights are formed in the optical member 50 when light is concentrated on certain regions or is totally internally reflected and thus fails to pass through the regions where it is reflected. These bright and dark lines may reduce the overall luminance uniformity of the optical member 50. In addition, as a gap P between the light sources 70 and the luminance of the light sources 70 are increased, e.g., in a situation where a display size is increased yet the number of light sources remains the same, the luminance non-uniformity of the exit surface 52 of the optical member 50 may increase.

In particular, dark lines may be formed in regions directly above the light sources 70 since light is totally internally reflected in these regions. Therefore, the diffusion pattern 54 is formed in the regions directly above the light sources 70. In one exemplary embodiment, the diffusion pattern 54 may extend horizontally beyond the boundaries of the light source 70 as shown in FIG. 2.

Exemplary embodiments include configurations wherein the diffusion pattern 54 may be formed by processing the incident surface 51 using a sand bluster or by coating paints, which diffuse light, on the incident surface 51. The diffusion pattern 54 may be shaped like a band having a predetermined width. That is, when the light sources 70 are line light sources, e.g., fluorescent tubes, as shown in FIG. 1, the diffusion pattern 54 having a predetermined width D may extend along each of the light sources 70 in a lengthwise direction of the light sources 70 and the prism pattern 53.

The width D of the diffusion patter 54 may vary according to a distance H between the light sources 70 and the optical member 50. The distance between the diffusion patterns 54 may be controlled by the gap P between the light sources 70, e.g., the distance between adjacent diffusion patterns 54 in FIG. 2 is P minus D.

A path of light that passes through the optical member 50 and a region in which the diffusion pattern 54 is formed will now be described in detail with reference to FIGS. 2 and 3. Here, an exemplary embodiment wherein a cross-sectional shape of the prism pattern 53 taken along line II-II' of FIG. 1 is an isosceles triangle will be described.

When light emitted from the light sources 70 enters the optical member 50 at an angle less than a predetermined angle $\theta$ with respect to a vertical line L, it may be totally internally reflected at both a first surface 52a and a second surface 52b of the exit surface 52, and be reflected to exit back out through the incident surface 51. Thus, in a region where light is totally internally reflected at the first and second surfaces 52a and 52b, the diffusion pattern 54 may be formed to diffuse light incident on the incident surface 51 so that the light can exit through the first and second surfaces 52a and 52b.

When D is the width of the diffusion pattern 54, H is the distance between the light sources 70 and the optical member 50, $\theta$ is an angle of incident light with respect to the vertical line L, and n is a refractive index of the prism pattern 53, a total internal reflection region where light is totally internally reflected at the first and second surfaces 52a and 52b of the prism pattern 53 refers to a region where $90°-a-\cos^{-1}(1/n) < \theta < 90°-3a+\cos^{-1}(1/n)$, and the diffusion pattern 54 is formed to overlap the total internal reflection region. For the width D of the diffusion pattern 54, the above equation may be rearranged into $H*\tan(90°-a-\cos^{-1}(1/n)) < D < H*\tan(90°-3a+\cos^{-1}(1/n))$, and total internal reflection occurs when the width D of the diffusion pattern 54 satisfies this inequality.

Conditions for total internal reflection will now be described in more detail. First, parameters and variables of the above equations are as follows:

D: the width of the diffusion pattern 54 based on the vertical line L between each of the light sources 70 and the optical member 50, H: the distance between the light sources 70 and the optical member 50, θ0: an angle of incident light to the vertical line L, n: a refractive index of the prism pattern 53, α: a base angle of the prism pattern 53, β: an angle formed by the vertical line L, which extends from each of the light sources 70, and the first surface 52a, δ: an angle of incident light with respect to the first surface 52a, r: a radius of each of the light sources 70, and Ω: an angle of light, which is reflected at the first surface 52a, with respect to the second surface 52b.

Since the sum of interior angles of a triangle is 180 degrees, δ=180−β−θ and Ω=2α−δ.

Light can be totally internally reflected at the second surface 52b when Ω<cos−1(1/n), which may be obtained by using Snell's law as would be apparent to one of ordinary skill in the art.

In addition, light can be totally internally reflected at the first surface 52a when $\delta < \cos^{-1}(1/n)$.

The above conditions for total internal reflection at the first and second surfaces 52a and 52b may be combined into the inequality $2\alpha - \cos^{-1}(1/n) < \delta < \cos^{-1}(1/n)$, which, in turn, may be rearranged into the inequality $90° - \alpha - \cos^{-1}(1/n) < \theta < 90° - 3\alpha + \cos^{-1}(1/n)$ in terms of the angle θ of incident light to the vertical line L.

In addition, the equation for the angle θ of incident light may be transformed into $H*\tan(90° - \alpha - \cos^{-1}(1/n)) < D < H*\tan(90° - 3\alpha + \cos^{-1}(1/n))$ when expressed in terms of the width D of the diffusion pattern 54 based on the vertical line L between each of the light sources 70 and the optical member 50.

Therefore, a region which satisfies any one of the two inequalities for the angle θ of incident light and for the width D of the diffusion pattern 54, is defined as the total internal reflection region.

When the radius r of the light sources 70 is factored into the above relation to calculate a length Ld of the region of the diffusion pattern 54 (hereinafter, referred to as a diffusion pattern region), the length Ld of the diffusion pattern region is equal to $2 \times r + H \times \tan(90° - 3\alpha + \cos^{-1}(1/n))$.

In an exemplary embodiment, when the base angle α of the prism pattern 53 is about 45 degrees and when the refractive index n of the prism pattern 53 is about 1.5 to about 1.65, the length Ld of the diffusion pattern region satisfies the inequality $0.112 \times H + 2 \times r < Ld < 0.27 \times H + 2 \times r$.

Figure 4:
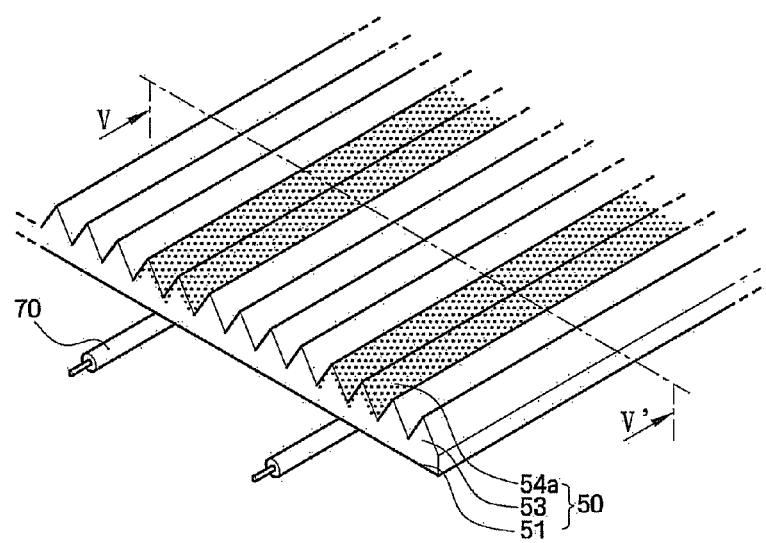
FIG. 4 is a partial front-perspective view of a second exemplary embodiment of an optical member and light sources according to the present invention.
Figure 5:
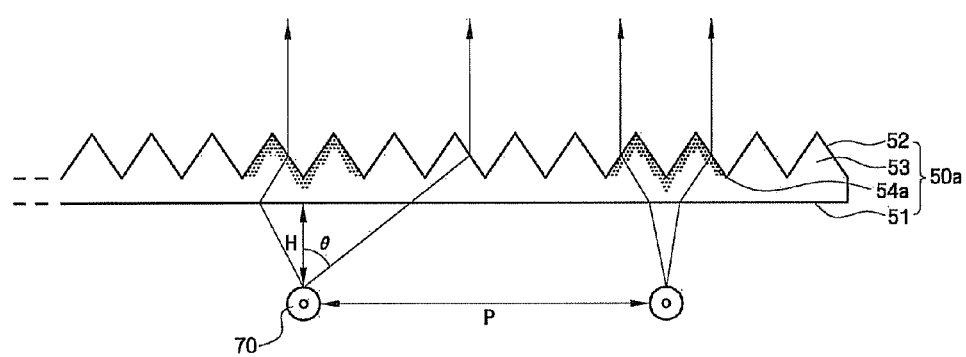
FIG. 5 is a cross-sectional view of the second exemplary embodiment of an optical member and the light sources taken along line V-V' of FIG. 4.

Hereinafter, a second exemplary embodiment of an optical member 50 according to the present invention will be described in detail with reference to FIGS. 4 and 5. FIG. 4 is a partial perspective view of the second exemplary embodiment of an optical member 50 and light sources 70 according to the present invention. FIG. 5 is a cross-sectional view of the second exemplary embodiment of an optical member 50 and the light sources 70 taken along line V-V' of FIG. 4. For simplicity, elements substantially identical to those of the first exemplary embodiment are indicated by like reference numerals, and thus their description will be omitted.

In the second exemplary embodiment of an optical member 50 according to the present invention, a diffusion pattern 54a is formed on an exit surface 52. That is, the diffusion pattern 54a may be formed on a prism pattern 53 which is formed on the exit surface 52 of the optical member 50. When light is incident on the diffusion pattern 54a formed on the prism pattern 53, an angle of reflection of the incident light is changed and thus passes through the prism pattern 53, thereby reducing, or effectively eliminating, dark spots due to total internal reflection.

In one exemplary embodiment, the diffusion pattern 54a may be formed on the prism pattern 53 by processing the exiting surface 52 using a sand bluster or by coating paints, which diffuse light, on the exiting surface 52.

As described above, the diffusion pattern 54a is formed in a total internal reflection region where light incident on the incident surface 51 is totally internally reflected toward the incident surface 51.

Figure 6:
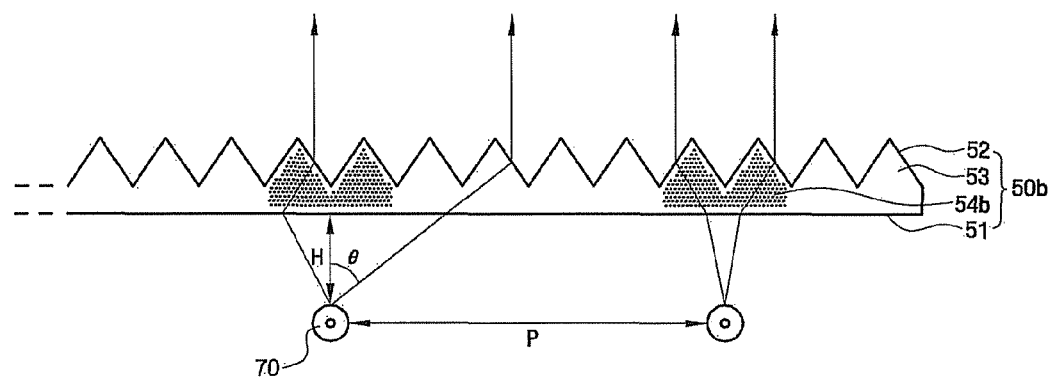
FIG. 6 is a cross-sectional view of a modified exemplary embodiment of the optical member shown in FIG. 5.

FIG. 6 is a cross-sectional view of a modified exemplary embodiment of the exemplary embodiment of an optical member 50 shown in FIG. 5.

In an exemplary embodiment of an optical member 50 according to the modified embodiment of the second exemplary embodiment, a diffusion pattern 54b is dispersed between an incident surface 51 and an exit surface 52. That is, while the optical member 50 is manufactured, a dispersing agent is injected into the optical member 50 to form the diffusion pattern 54b. The dispersing agent may then be spread substantially uniformly from the incident surface 51 to the exiting surface 52. Exemplary embodiments of the dispersing agent may include beads or cavities having different densities from the surrounding optical member 50 material. As described above, the diffusion pattern 54b is formed in a total internal reflection region where light incident on the incident surface 51 is totally internally reflected toward the incident surface 51.

Figure 7:
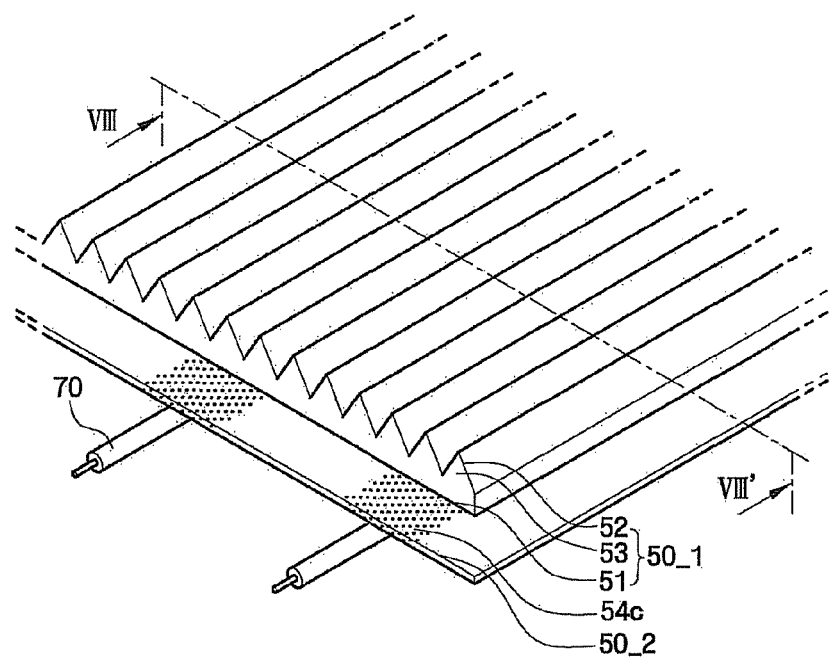
FIG. 7 is a partial front-perspective view of a third exemplary embodiment of an optical member and light sources according to the present invention.
Figure 8:
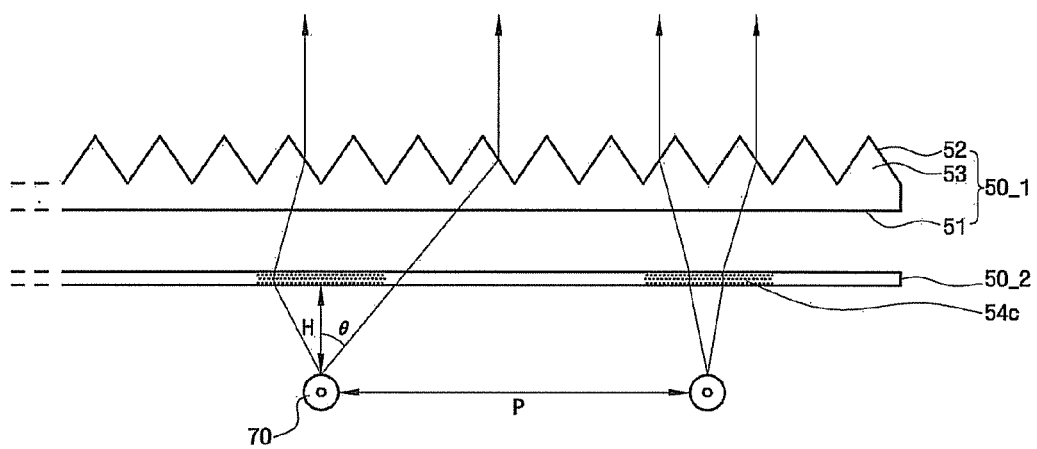
FIG. 8 is a cross-sectional view of the third exemplary embodiment of an optical member and the light sources taken along line VIII-VIII' of FIG. 7.

Hereinafter, a third exemplary embodiment of an optical member 50 according to the present invention will be described in detail with reference to FIGS. 7 and 8. FIG. 7 is a partial perspective view of the third exemplary embodiment of an optical member 50 and light sources 70 according to the present invention. FIG. 8 is a cross-sectional view of the third exemplary embodiment of an optical member 50 and the light sources 70 taken along line VIII-VIII' of FIG. 7. For simplicity, elements substantially identical to those of the first exemplary embodiment are indicated by like reference numerals, and thus their description will be omitted.

The third exemplary embodiment of an optical member 50 according to the present invention includes a first optical member 50_1 and a second optical member 50_2. The first optical member 50_1 includes a prism pattern 53, and the second optical member 50_2 includes a diffusion pattern 54c.

Figure 10:
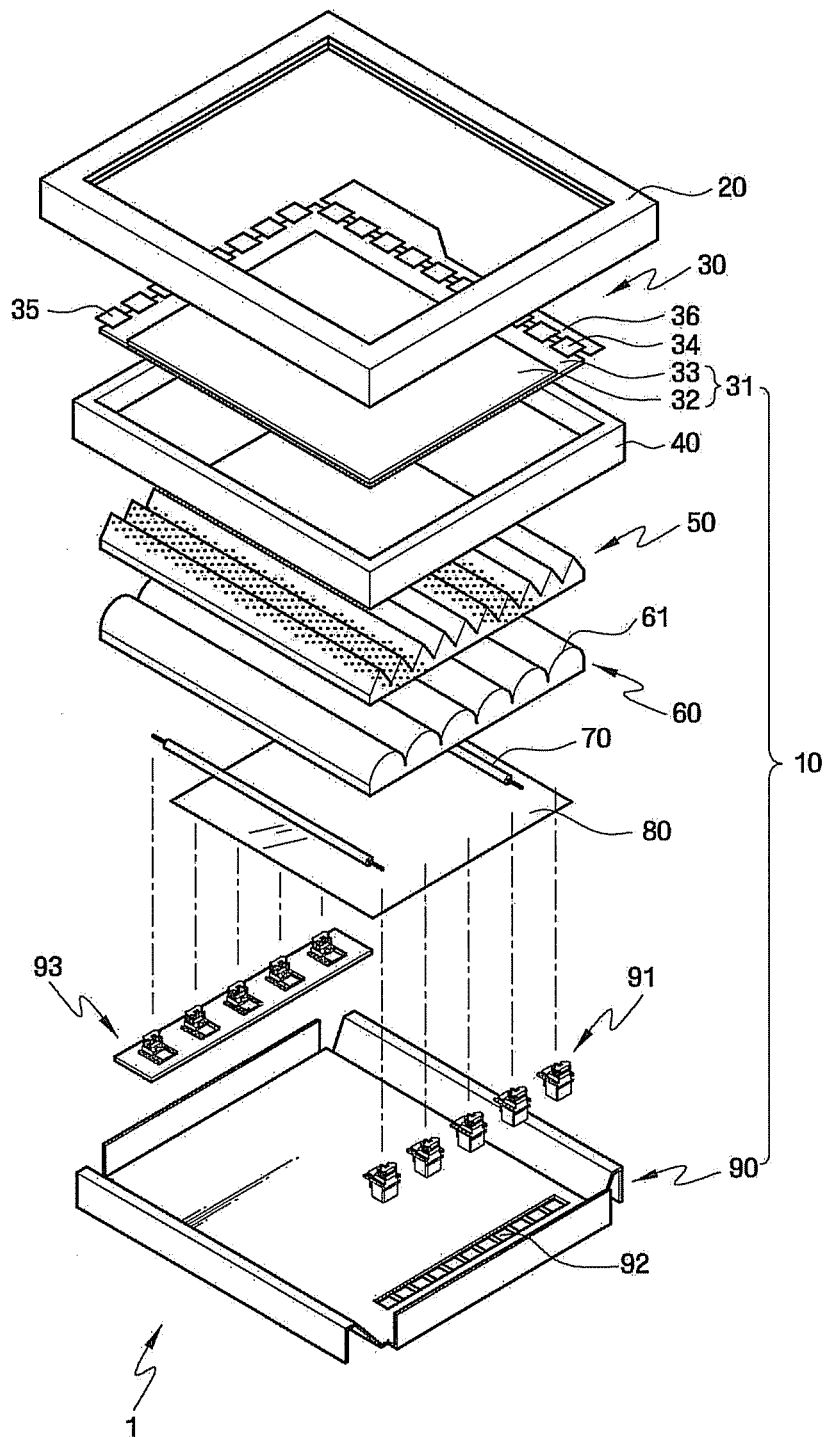
FIG. 10 is an exploded perspective view of an exemplary embodiment of a display device according to the present invention.

The first optical member 50_1 is disposed on the second optical member 50_2 and includes the prism pattern 53 on its top surface from which light exits toward the display panel (to be described in more detail with respect to FIG. 10). The second optical member 502 includes the diffusion pattern 54c which underlies the prism pattern 53, and the light sources 70 are disposed under the second optical member 50_2. That is, an incident surface 51 of the first optical member 50_1 is adjacent to an exit surface of the second optical member 50_2.

The diffusion pattern 54c formed in the second optical member 50_2 underlies each total internal reflection region of the first optical member 50_1. That is, a region, in which light input from each of the light sources 70 to the incident surface 51 is totally internally reflected, overlaps the diffusion pattern 54c of the second optical member 50_2. The diffusion pattern 54c may be formed similarly to the diffusion pattern 54 described above with respect to the previous exemplary embodiments.

An alternative exemplary embodiment (not shown) includes a configuration wherein the second optical member 50_2 includes a plurality of second optical members 502, each of the plurality of second optical members 50_2 having only the diffusion pattern 54c.

Figure 9:
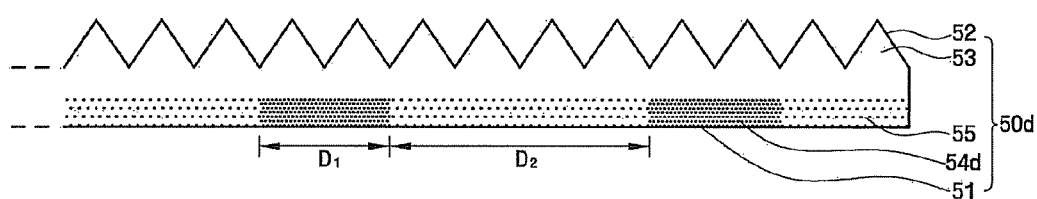
FIG. 9 is a cross-sectional view of a fourth exemplary embodiment of an optical member according to the present invention.

Hereinafter, a fourth exemplary embodiment of an optical member 50d according to the present invention will be described in detail with reference to FIG. 9. FIG. 9 is a cross-sectional view of the fourth exemplary embodiment of an optical member 50 according to the present invention. For simplicity, elements substantially identical to those of the first exemplary embodiment are indicated by like reference numerals, and thus their description will be omitted.

The fourth exemplary embodiment of an optical member 50d according to the present invention includes a first diffusion pattern 54d and a second diffusion pattern 55 which have different light-diffusing capabilities. The light-diffusing capability denotes the degree to which incident light is diffused as it passes through a diffusion pattern. That is, the light-diffusing capability denotes the degree to which incident light is diffused according to the density of a diffusion pattern or the size of particles of the diffusion pattern. Therefore, a diffusion pattern having a high light-diffusing capability may be understood as a diffusion pattern with a comparably greater density or with a comparably larger particle size at a comparably equal density.

As described above, the first diffusion pattern 54d overlaps each total internal reflection region $D_1$ of a prism pattern 53, and the second diffusion pattern 55 overlaps each transmission region $D_2$ in which incident light passes through an exit surface 52. In the present exemplary embodiment, the first diffusion pattern 54d has a greater light-diffusing capability than the second diffusion pattern 55. The first diffusion pattern 54d and the second diffusion pattern 55 may be formed on the incident surface 51 or the exit surface 52.

Alternative exemplary embodiments include configurations wherein a separate optical member having the first diffusion pattern 54d and a separate member having the second diffusion pattern 55 may be formed to overlap each other (not shown). Such an embodiment is similar to a combination of the first exemplary embodiment of FIG. 1 and the third exemplary embodiment of FIG. 7 except that one of the diffusion patterns 54d or 55 is formed to underlie a non-reflection region.

Figure 11:
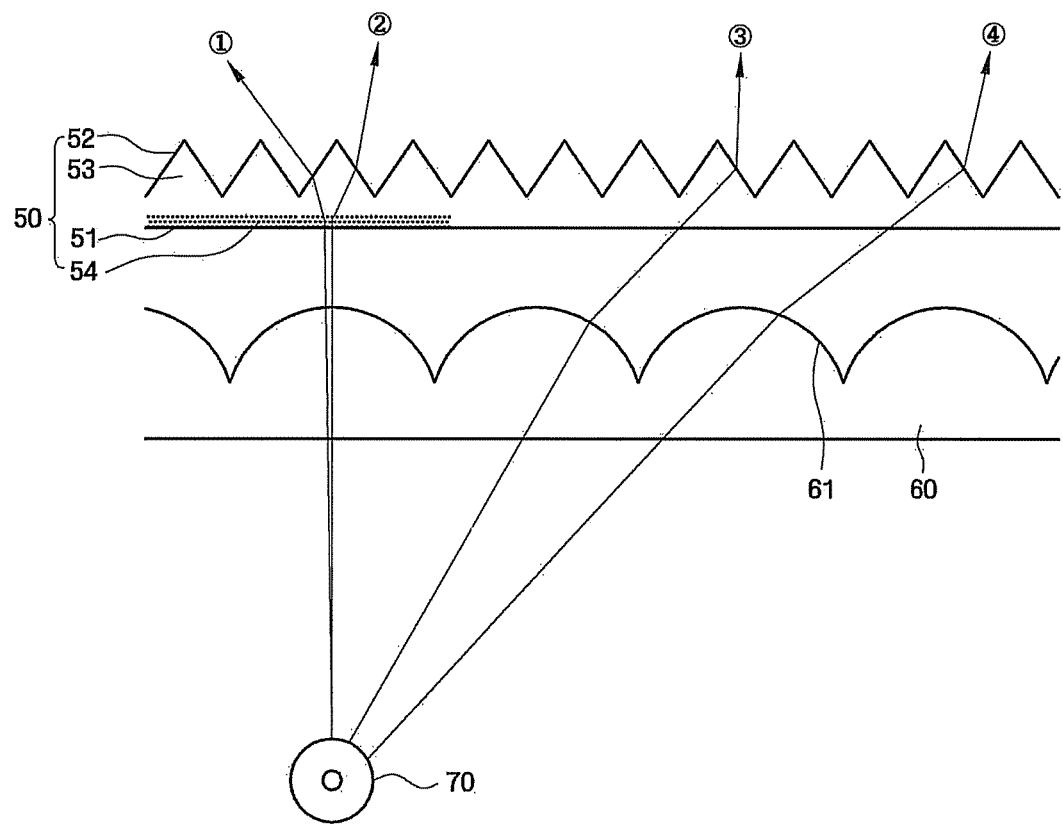
FIG. 11 is a cross-sectional view of exemplary embodiments of an optical member, a diffusion plate, and light sources included in the exemplary embodiment of a display device of FIG. 10.

Hereinafter, an exemplary embodiment of a display device 1 according to the present invention will be described in detail with reference to FIGS. 10 and 11. FIG. 10 is an exploded perspective view of the exemplary embodiment of a display device 1 according to the present invention. FIG. 11 is a cross-sectional view of an optical member 50, a diffusion plate 60, and light sources 70 included in the display device 1 of FIG. 10.

Referring to FIG. 10, the exemplary embodiment of a display device 1 according to the present invention includes a display panel assembly 30, an upper housing 20, an intermediate frame 40, the optical member 50, the diffusion plate 60, the light sources 70, light-source sockets 91, and a lower housing 90.

The display panel assembly 30 includes the display panel 31, which includes a lower display panel 32, an upper display panel 33, and a liquid crystal layer (not shown) interposed between the lower and upper display panels 32 and 33, a gate tape carrier package 35, a data tape carrier package 34, and an integrated printed circuit board ("PCB") 36. Alternative exemplary embodiments include configurations wherein the gate tape carrier package 35, the data tape carrier package 34 and the integrated PCB 36 may be omitted or modified as would be apparent to one of ordinary skill in the art.

The display panel 31 includes the lower display panel 32, which has gate lines (not shown), data lines (not shown), a thin-film transistor ("TFT") array and pixel electrodes, and the upper display panel 33 which has a black matrix and a common electrode and faces the lower display panel 32. The display panel 31 displays image information.

The gate tape carrier package 35 is connected to each gate line (not shown) formed on the lower display panel 32, and the data tape carrier package 34 is connected to each data line (not shown) formed on the lower display panel 32. In the present exemplary embodiment, each of the gate tape carrier package 35 and the data tape carrier package 34 includes a tape automated bonding ("TAB") tape which includes wiring patterns formed on a base film and a semiconductor chip bonded to the wiring patterns by a TAB technique.

A number of driving parts are mounted on the PCB 36 to transmit a gate-driving signal to the gate tape carrier package 35 and a data-driving signal to the data tape carrier package 34.

The upper housing 20 forms the exterior of the display device 1 and has a space to accommodate the display panel assembly 30. In addition, an open window is formed in the center of the upper housing 20 to expose the display panel 31.

The upper housing 20 is coupled to the lower housing 90 with the intermediate frame 40 interposed therebetween.

The intermediate frame 40 accommodates the optical member 50, the diffusion plate 60, the light sources 70 and the light-source sockets 91 and is firmly fixed to the lower housing 90. In the present exemplary embodiment, the rectangular intermediate frame 40 includes sidewalls formed along edges thereof. An open window is formed in the center of the intermediate frame 40 to allow light that passed through the diffusion plate 60 and the optical member 50 to also pass through the intermediate frame 40. Alternative exemplary embodiments include configurations wherein the intermediate frame 40 is omitted and at least one of the upper housing 20 or the lower housing 90 is extended to accommodate the optical member 50, the diffusion plate 60, the light sources 70 and the light-source sockets 91.

The optical member 50 includes a prism pattern 53 which diffuses and concentrates light that is received from the diffusion plate 60. The optical member 50 is disposed on the diffusion plate 60 and housed in the intermediate frame 40. In addition to the optical member 50, a prism sheet (not shown), a diffusion sheet (not shown), and a protective sheet (not shown) may further be included in the display device 1.

The diffusion plate 60 diffuses light, which is emitted from the light sources 70, in substantially all directions. The diffusion plate 60 prevents bright lines, which are bright portions formed corresponding to the shapes of the light sources 70, from being seen from the front of the display device 1. The diffusion plate 60 may be made of a transparent material and include a lens pattern 61 on its top surface to diffuse light emitted from the light sources 70.

Referring to FIG. 11, the optical member 50 may be disposed on the diffusion plate 60, and the prism pattern 53 of the optical member 50 and the lens pattern 61 of the diffusion plate 60 may have different pitches. In one exemplary embodiment, the pitch of the lens pattern 61 may be three to five times greater than that of the prism pattern 53. The pitch means the distance between the lens pattern 61 or the distance between the prism pattern 53.

The paths that light emitted from the light sources 70 takes in passing through the lens pattern 61 of the diffusion plate 60 and the prism pattern 53 of the optical member 50 will now be described in detail. Specifically, light emitted from the light sources 70 may be divided into rays 1 and 2 which are substantially vertically incident on the diffusion plate 60 and rays 3 and 4 which are obliquely incident on the diffusion plate 60 and described separately.

The rays 1 and 2, which are substantially vertically incident on the diffusion plate 60, are only slightly refracted when passing through the top of the lens pattern 61 of the diffusion plate 60 and travel straight in an upward direction. That is, of light emitted from the light sources 70, some of light that is substantially vertically incident on the diffusion plate 60 is not refracted at all. Therefore, results similar to those, which can be obtained when the optical member 50 is disposed immediately above the light sources 70, can be obtained. Accordingly, as described above, a diffusion pattern 54 is formed in a region that overlaps each of the light sources 70 to diffuse light.

The rays 3 and 4, which are obliquely incident on the diffusion plate 60, may be significantly refracted by the lens pattern 61 of the diffusion plate 60 and output accordingly. While the paths of the rays 3 and 4 obliquely incident on the diffusion plate 60 are partially changed by the diffusion plate 60 as described above, the rays 3 and 4 are diffused in various directions and output accordingly from the lens pattern 61.

When the diffusion plate 60 overlaps the optical member 50 in this way, light from the light sources 70 can be diffused more effectively. That is the light sources 70 can function as a surface light source which provides substantially uniform light.

The optical member 50 may not necessarily be disposed on the diffusion plate 60. That is, alternative exemplary embodiments include configurations wherein the optical member 50 may be disposed under the diffusion plate 60.

The display device 1 may include the optical member 50 and the diffusion plate 60 as separate components. Alternative exemplary embodiments include configurations wherein the diffusion plate 60 may be removed, and only the optical member 50 may be included.

As described above, one or more members, which overlap each other, may be used to respectively perform functions of the optical member 50.

The light sources 70 may be line light sources such as cold cathode fluorescent lamps ("CCFLs") or hot cathode fluorescent lamps ("HCFLs") as discussed briefly above. When the light sources 70 are HCFLs, each of the HCFLs includes two terminals at each of both ends thereof. The terminals are inserted into the light-source sockets 91 and a ground socket 93 to be supplied with power. Alternative exemplary embodiments include configurations wherein the light sources may be supplied with power via various other configurations.

A reflective sheet 80 is disposed under the light sources 70 and reflects light, which is emitted downward from the light sources 70, upward to enhance light-emitting efficiency.

The light-source sockets 91 are exposed through socket insertion grooves 92 formed in a bottom surface of the lower housing 90. In addition, inverters (not shown) are inserted into the light-source sockets 91 which are exposed through the socket insertion grooves 92, respectively.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An optical member comprising:
 a single unitary indivisible optical member having an incident surface on which light is incident and an exit surface which is disposed substantially opposite the incident surface and from which the light exits;
 a prism pattern defining the exit surface; and
 a diffusion pattern which is aligned with the prism pattern and is disposed only in a total internal reflection region in which the light incident on the incident surface is totally internally reflected by the prism pattern and output through the incident surface.

2. The member of claim 1, wherein when a cross section of each prism of the prism pattern is an isosceles triangle whose bottom side is substantially parallel to the incident surface, and
 wherein when a base angle of the isosceles triangle is α, when a refractive index of the prism pattern is n, and when an incidence angle of the incident light is θ, then the above variables conform to the following inequality:

$$90°-\alpha-\cos^{-1}(1/n)<\theta<90°-3\alpha+\cos^{-1}(1/n)$$

in the total internal reflection region.

3. The member of claim 1, wherein the diffusion pattern is disposed on at least one of the incident surface and the exit surface.

4. The member of claim 1, wherein the diffusion pattern comprises a dispersion material dispersed between the incident surface and the exit surface.

5. The member of claim 1, wherein the optical member comprises:
 a first optical member; and
 a second optical member which overlaps the first optical member,
 wherein the prism pattern is disposed on the second optical member, and the diffusion pattern is disposed on the first optical member.

6. The member of claim 5, wherein the first optical member is adjacent to an incident surface of the second optical member.

7. An optical member comprising:
 a single unitary indivisible optical member having an incident surface on which light is incident and an exit surface which is disposed substantially opposite the incident surface and from which the light exits;
 a prism pattern defining the exit surface;
 a first diffusion pattern which is aligned with the prism pattern and is disposed only in a total internal reflection region in which the light incident on the incident surface is totally internally reflected by the prism pattern; and
 a second diffusion pattern which is aligned with the prism pattern and is disposed in a transmission region in which the light incident on the incident surface passes through the prism pattern,
 wherein the first diffusion pattern has a greater light-diffusing capability than the second diffusion pattern.

8. The member of claim 7, wherein the first diffusion pattern has a greater density than the second diffusion pattern.

9. The member of claim 7, wherein when a cross section of each prism of the prism pattern is an isosceles triangle whose bottom side is substantially parallel to the incident surface, and
 wherein when a base angle of the isosceles triangle is α, when a refractive index of the prism pattern is n, and when an incidence angle of the incident light is θ, then the above variables conform to the following inequality:

$$90°-\alpha-\cos^{-1}(1/n)<\theta<90°-3\alpha+\cos^{-1}(1/n)$$

in the total internal reflection region.

10. The member of claim 7, wherein the first diffusion pattern and the second diffusion pattern are disposed on at least one of the incident surface and the exit surface.

11. The member of claim 7, comprising:
a first optical member; and
a second optical member which overlaps the first optical member,
wherein the prism pattern is disposed on the second optical member, and the diffusion pattern is disposed on the first optical member.

12. A display device comprising:
light sources which emit light;
a display panel which receives the light and displays an image; and
a single unitary indivisible optical member which is interposed between the light sources and the display panel,
wherein the optical member comprises:
an incident surface on which the light is incident;
an exit surface which is disposed substantially opposite the incident surface and from which the light exits;
a prism pattern defining the exit surface; and
a diffusion pattern which is aligned with the prism pattern and is disposed only in a total internal reflection region in which the light incident on the incident surface is totally internally reflected by the prism pattern and output through the incident surface.

13. The device of claim 12, wherein when a cross section of each prism of the prism pattern is an isosceles triangle whose bottom side is substantially parallel to the incident surface, when a base angle of the isosceles triangle is $\alpha$, when a refractive index of the prism pattern is n, when a distance between the light sources and the optical member is H, and when a width of the diffusion pattern formed with a midpoint on a vertical line between each of the light sources and the optical member is D, the above variables conform to the following inequality: $H*\tan(90°-\alpha-\cos^{-1}(1/n))<D<H*\tan(90°-3\alpha+\cos^{-1}(1/n))$.

14. The device of claim 12, wherein when the cross section of each prism of the prism pattern is an isosceles triangle whose bottom side is substantially parallel to the incident surface, when the base angle of the isosceles triangle is $\alpha$, when the refractive index of the prism pattern is n, when the distance between the light sources and the optical member is H, and when a radius of each of the light sources is r, a length of the diffusion pattern region formed from the vertical line between each of the light sources and the optical member is substantially equal to: $2\times r+H\times\tan(90°-3\alpha+\cos^{-1}(1/n))$.

15. The device of claim 14, wherein when the distance between the light sources and the optical member is H, when a radius of each of the light sources is r, and when the length of the diffusion pattern region is Ld, the above variables conform to the following inequality: $0.112\times H+2\times r<Ld<0.27\times H+2\times r$.

16. The device of claim 12, wherein the diffusion pattern is disposed on at least one of the incident surface and the exit surface.

17. The device of claim 12, wherein the diffusion pattern comprises a dispersion material dispersed between the incident surface and the exit surface.

18. The device of claim 12, wherein the optical member comprises:
a first optical member; and
a second optical member which overlaps the first optical member,
wherein the prism pattern is disposed on the second optical member, and the diffusion pattern is disposed on the first optical member.

19. The device of claim 18, wherein the first optical member is adjacent to an incident surface of the second optical member.

20. A display device comprising:
light sources which emits light;
a display panel which receives the light and displays an image; and
a single unitary indivisible optical member which is interposed between the light sources and the display panel,
wherein the optical member comprises:
an incident surface on which the light is incident;
an exit surface which is disposed substantially opposite to the incident surface and from which the light exits;
a prism pattern defining the exit surface;
a first diffusion pattern which is aligned with the prism pattern and is disposed only in a region in which the light incident on the incident surface is totally internally reflected by the prism pattern; and
a second diffusion pattern which is aligned with the prism pattern and is disposed in a region in which the light incident on the incident surface passes through the prism pattern,
wherein the first diffusion pattern has a greater light-diffusing capability than the second diffusion pattern.

21. The device of claim 20, wherein the first diffusion pattern has a greater density than the second diffusion pattern.

22. The device of claim 20, wherein when a cross section of each prism of the prism pattern is an isosceles triangle whose bottom side is substantially parallel to the incident surface, when a base angle of the isosceles triangle is $\alpha$, when a refractive index of the prism pattern is n, when a distance between the light sources and the optical member is H, and when a width of the diffusion pattern formed with a midpoint on a vertical line between each of the light sources and the optical member is D, the above variables conform to the following inequality: $H*\tan(90°-\alpha-\cos^{-1}(1/n))<D<H*\tan(90°-3\alpha+\cos^{-1}(1/n))$.

23. The device of claim 20, wherein when the cross section of each prism of the prism pattern is an isosceles triangle whose bottom side is substantially parallel to the incident surface, when the base angle of the isosceles triangle is $\alpha$, when the refractive index of the prism pattern is n, when the distance between the light sources and the optical member is H, and when a radius of each of the light sources is r, a length of the diffusion pattern region formed from the vertical line between each of the light sources and the optical member is substantially equal to $2\times r+H\times\tan(90°-3\alpha+\cos^{-1}(1/n))$.

24. The device of claim 23, wherein when the distance between the light sources and the optical member is H, when a radius of each of the light sources is r, and when the length of the diffusion pattern region is Ld, the above variables conform to the following inequality: $0.112\times H+2\times r<Ld<0.27\times H+2\times r$.

25. The device of claim 20, wherein the first diffusion pattern and the second diffusion pattern are disposed on at least one of the incident surface and the exit surface.

26. The device of claim 20, wherein the optical member comprises:
a first optical member being the single unitary indivisible optical member; and
a second optical member which overlaps the first optical member,
wherein the diffusion pattern is disposed on the second optical member.

* * * * *